United States Patent [19]
Song

[11] Patent Number: 5,459,516
[45] Date of Patent: Oct. 17, 1995

[54] VIDEO MOTION COMPENSATION APPARATUS

[75] Inventor: Ki H. Song, Seoul, Rep. of Korea

[73] Assignee: Goldstar Co., Ltd., Seoul, Rep. of Korea

[21] Appl. No.: 276,702

[22] Filed: Jul. 18, 1994

[30] Foreign Application Priority Data

Jul. 16, 1993 [KR] Rep. of Korea ............... 13461/1993

[51] Int. Cl.⁶ ............................................. H04N 7/50
[52] U.S. Cl. ..................... 348/402; 348/699; 348/716; 348/718
[58] Field of Search .................................. 348/402, 413, 348/416, 699, 716, 718; H04N 7/133, 7/137

[56] References Cited

U.S. PATENT DOCUMENTS 5,040,061  8/1991  Yonemitsu ............................ 358/342
5,379,076  3/1995  Song ..................................... 348/402

FOREIGN PATENT DOCUMENTS 0424269  10/1990  European Pat. Off. ......... H04N 7/00

*Primary Examiner*—Howard W. Britton
*Attorney, Agent, or Firm*—Fliesler, Dubb, Meyer & Lovejoy

[57] ABSTRACT

A video motion compensation apparatus comprising an X-read address generation circuit for generating X-read address components in response to a macro block address and an X-motion vector component, a Y-read address generation circuit for generating a Y-read address component in response to a macro slice address and a Y-motion vector component, a write address generation circuit for generating X and Y-write address components in response to the macro slice address and the macro block address, a multiplexing circuit for multiplexing the Y-read address component, the X-read address components and the X and Y-write address components to generate read and write addresses of first and second frame memories, and a data processing circuit for reading video data from a location of one of the first and second frame memories corresponding to the read address from the multiplexing circuit, adding the read video data to inverse discrete cosine transform video data and writing the resultant video data into a location of the other of the first and second frame memories corresponding to the write address from the multiplexing circuit.

5 Claims, 5 Drawing Sheets

VIDEO MOTION COMPENSATION APPARATUS

BACKGROUND OF THE INVENTION

1. Field of the Invention

The present invention relates in general to the compensation for a motion of a high definition video, and more particularly to a video motion compensation apparatus in which read and write operations of frame memories are processed in parallel at divided eight phases, so that a large amount of data can be processed in real time.

2. Description of the Prior Art

Video motion compensation is for reproducing video data compressed and transmitted to a decoder stage to a better picture quality using a motion vector detected at an encoder stage. For such video motion compensation, there are conventionally employed two frame memories. Video data is read from a location of the first frame memory corresponding to an address varied by a motion amount from a location of a macro block of 16×16 pixels. The read video data from the first frame memory is added to input video data and then written into the second frame memory.

Referring to FIG. 1, there is shown a block diagram of a conventional video motion compensation apparatus. As shown in this drawing, the conventional video motion compensation apparatus comprises an address generator 11 for generating read and write addresses of frame memories 13 and 14 in response to a macro block address MBA designating an X-location of a macro block, a macro slice address MSA designating a Y-location of the macro block and a motion vector (X,Y) and outputting the generated read and write addresses to an address controller 12.

The address controller 12 is adapted to apply the read and write addresses from the address generator 11 to the frame memories 13 and 14 and output a control signal to a data input/output (I/O) controller 15.

The data I/O controller 15 is operated in response to the control signal from the address controller 12 to select one of the frame memories 13 and 14 in a data read operation and the other frame memory 13 or 14 in a data write operation.

Each of the frame memories 14 and 15 is operated under the control of the data I/O controller 15 to output video data stored in its location corresponding to the read address from the address controller 12 to an adder 16 and store video data from the adder 16 in its location corresponding to the write address from the address controller 12.

The adder 16 is adapted to add the video data from one of the frame memories 13 and 14 to inverse discrete cosine transform (IDCT) video data and output the resultant video data to the other frame memory 13 or 14.

A clock generator 10 is also provided in the conventional video motion compensation apparatus to count input clocks to generate a clock signal.

The operation of the conventional video motion compensation apparatus with the above-mentioned construction will hereinafter be described.

The macro block address MBA designating the X-location of the macro block, the macro slice address MSA designating the Y-location of the macro block and the motion vector (X,Y) are applied from an encoder (not shown) to the address generator 11. Then, the address generator 11 generates the read and write addresses of the frame memories 13 and 14 in response to the clock signal from the clock generator 10. As a result, video data of the macro block is read from the location of one of the frame memories 13 and 14 corresponding to the read address from the address generator 11. Also, video data the motion of which is compensated for by the motion vector from the location of the macro block is written into the location of the other frame memory 13 or 14 corresponding to the write address from the address generator 11. The read and write addresses from the address generator 11 are applied to the address controller 12.

The address controller 12 applies the read and write addresses from the address generator 11 to the frame memories 13 and 14 and outputs the control signal to the data I/O controller 15. In response to the control signal from the address controller 12, the data I/O controller 15 selects one of the frame memories 13 and 14 so that the video data can be read from the location of the selected memory 13 or 14 corresponding to the read address from the address controller 12. The read video data from the frame memory 13 or 14 is applied to the adder 16, which then adds the read video data to the IDCT video data. The resultant video data from the adder 16 is written into the location of the other frame memory 13 or 14, which is selected by the data I/O controller 15 under the control of the address controller 12, corresponding to the write address from the address controller 12.

The above-mentioned conventional video motion compensation apparatus must have a data processing speed of 60MHz or more to process a large amount of data in real time. In this connection, the conventional video motion compensation apparatus has the disadvantage that it is difficult to select components applicable to such a high frequency. Also, the use of such a high frequency makes the system unstable. Further, the use of an erasable programmable logic device (EPLD), being widely used now, is suppressed due to the limits of the frequency.

SUMMARY OF THE INVENTION

Therefore, the present invention has been made in view of the above problems, and it is an object of the present invention to provide a video motion compensation apparatus in which read and write operations of frame memories are processed in parallel at divided eight phases, so that a large amount of data can be processed in real time.

In accordance with the present invention, the above and other objects can be accomplished by a provision of a video motion compensation apparatus comprising X-read address generation means for generating X-read address components in response to a macro block address and an X-motion vector component; Y-read address generation means for generating a Y-read address component in response to a macro slice address and a Y-motion vector component; write address generation means for generating X and Y-write address components in response to the macro slice address and the macro block address; multiplexing means for multiplexing the Y-read address component from said Y-read address generation means, the X-read address components from said X-read address generation means and the X and Y-write address components from said write address generation means to generate read and write addresses of first and second frame memories; and data processing means for reading video data from a location of one of said first and second frame memories corresponding to the read address from said multiplexing means, adding the read video data to inverse discrete cosine transform video data and writing the resultant video data into a location of the other of said first and second frame memories corresponding to the write address from said multiplexing means; each of said first and second frame memories outputting the video data stored in its location corresponding to the read address from said multiplexing means to said data processing means and storing the video data from said data processing means in its location corresponding to the write address from said multiplexing means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

In the preferred embodiment of the present invention, video data is processed in the unit of a macro block (16×16 pixels) and one frame thereof is comprised of 1280×720 pixels. The video data of one frame is divided into 80 equal parts in an X-direction which are designated by macro block addresses and 45 equal parts in a Y-direction which are designated by macro slice addresses. The divided equal parts of the video data are the macro blocks.

Figure 1:
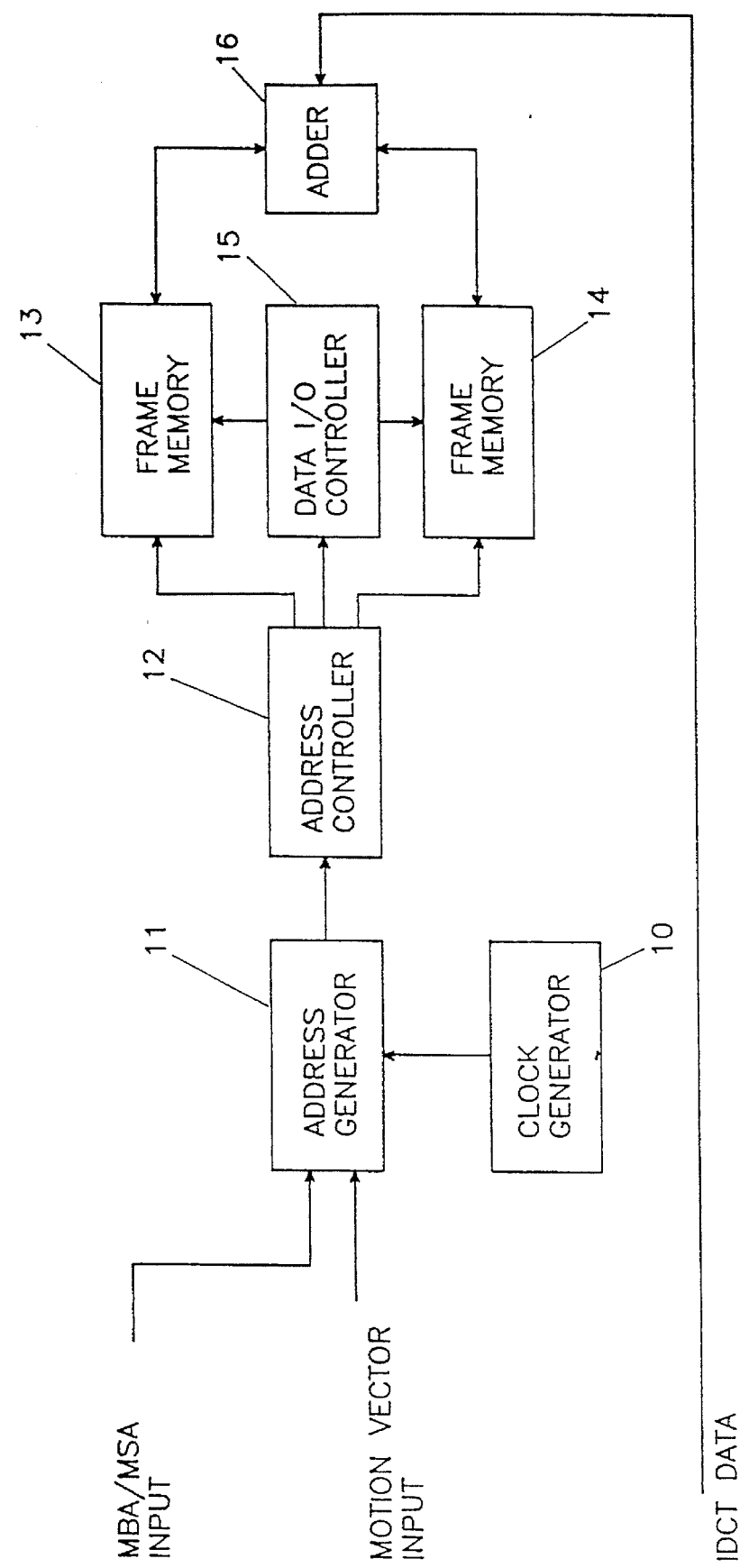
FIG. 1 is a block diagram of a conventional video motion compensation apparatus.
Figure 2:
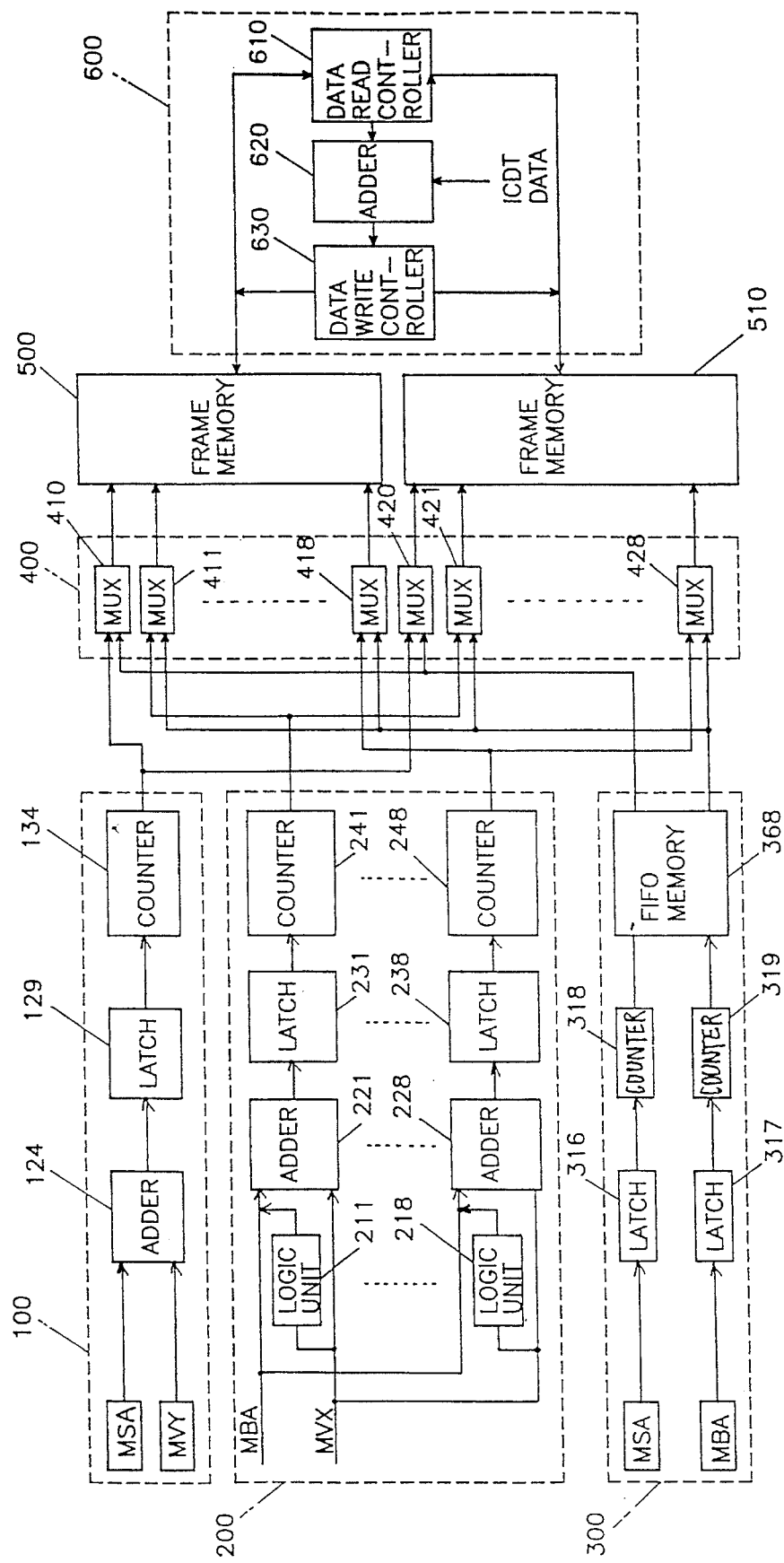
FIG. 2 is a block diagram of a video motion compensation apparatus in accordance with the present invention.

Referring to FIG. 2, there is shown a block diagram of a video motion compensation apparatus in accordance with the present invention. As shown in this drawing, the video motion compensation apparatus comprises a Y-read address generation circuit 100 for generating a Y-read address component in response to a macro slice address MSA and a Y-motion vector component MVY, an X-read address generation circuit 200 for generating X-read address components in response to a macro block address MBA and an X-motion vector component MVX, a write address generation circuit 300 for generating X and Y-write address components in response to the macro slice address MSA and the macro block address MBA, and a multiplexing circuit 400 for multiplexing the Y-read address component from the Y-read address generation circuit 100, the X-read address components from the X-read address generation circuit 200 and the X and Y-write address components from the write address generation circuit 300 to generate read and write addresses of frame memories 500 and 510.

A data processing circuit 600 is also provided in the video motion compensation apparatus to read video data from a location of one of the frame memories 500 and 510 corresponding to the read address from the multiplexing circuit 400, add the read video data to IDCT video data and write the resultant video data into a location of the other frame memory 500 or 510 corresponding to the write address from the multiplexing circuit 400.

Each of the frame memories 500 and 510 is adapted to output the video data stored in its location corresponding to the read address from the multiplexing circuit 400 to the data processing circuit 600 and store the video data from the data processing circuit 600 in its location corresponding to the write address from the multiplexing circuit 400.

The Y-read address generation circuit 100 includes an adder 124 for adding the macro slice address MSA and the Y-motion vector component MVY, a latch 129 for latching an output signal from the adder 124, and a counter 134 for counting an output signal from the latch 129 and outputting the counted result as the Y-read address component.

The X-read address generation circuit 200 includes eight logic units 211–218 for compensating for divided eight phases of each of the frame memories 500 and 510 in response to lower three bits of the X-motion vector component MVX, respectively, eight adders 221–228 for adding the remaining upper two bits of the X-motion vector component MVX to signals obtained by applying output signals from the logic units 211–218 to the macro block address MBA, respectively, eight latches 231–238 for latching output signals from the adders 221–228, respectively, and eight counters 241–248 for counting output signals from the latches 231–238 and outputting the counted results as the X-read address components, respectively.

The write address generation circuit 300 includes latches 316 and 317 for latching the macro slice address MSA and the macro block address MBA, respectively, counters 318 and 319 for counting output signals from the latches 316 and 317 and outputting the counted results as the X and Y-write address components, respectively, and a first-in-first-out (FIFO) memory 368 for outputting the X and Y-write address components from the counters 318 and 319 to the multiplexing circuit 400 in a first-in-first-out manner.

The multiplexing circuit 400 includes multiplexers 410 and 420 for multiplexing the Y-read address component from the Y-read address generation circuit 100 and the Y-write address component from the write address generation circuit 300 and outputting the resultant address to the frame memories 500 and 510, respectively, eight multiplexers 411–418 for multiplexing the X-read address components from the X-read address generation circuit 200 and the X-write address component from the write address generation circuit 300 and outputting the resultant addresses to the frame memory 500, respectively, and eight multiplexers 421–428 for multiplexing the X-read address components from the X-read address generation circuit 200 and the X-write address component from the write address generation circuit 300 and outputting the resultant addresses to the frame memory 510, respectively.

The data processing circuit 600 includes a data read controller 610 for reading the video data from the location of one of the frame memories 500 and 510 corresponding to the read address from the multiplexing circuit 400, an adder 620 for adding the video data read by the data read controller 610 to the IDCT video data, and a data write controller 630 for writing the resultant video data from the adder 620 into the location of the other frame memory 500 or 510 corresponding to the write address from the multiplexing circuit 400.

The operation of the video motion compensation circuit with the above-mentioned construction in accordance with the present invention will hereinafter be described in detail.

First, upon receiving the macro slice address MSA designating the Y-location of the macro block and the Y-motion vector component MVY, the adder 124 of the Y-read address generation circuit 100 adds the received two inputs. Then in the Y-read address generation circuit 100, the output signal from the adder 124 is latched by the latch 129 and then counted by the counter 134. As a result, the output signal from the counter 134 is applied as the Y-read address component to the multiplexing circuit 400.

On the other hand, the macro block address MBA designating the X-location of the macro block and the X-motion vector component MVX are inputted to the X-read address generation circuit 200. In the X-read address generation circuit 200, the logic units 211–218 provide their output signals in response to the lower three bits MVX2–MVX0 of the X-motion vector component MVX to compensate for the divided eight phases of each of the frame memories 500 and 510, respectively. The output signals from the logic units 211–218 are applied as least significant bits of inputs of the adders 221–228, respectively, which also receive bits MBA0–MBA6 of the macro block address MBA as the remaining input bits in common. The adders 221–228 also input the remaining upper two bits MVX4 and MVX3 of the X-motion vector component MVX in common. The operations of the logic units 211–218 will hereinafter be described in more detail with reference to FIGS. 3 to 5.

Figure 5:
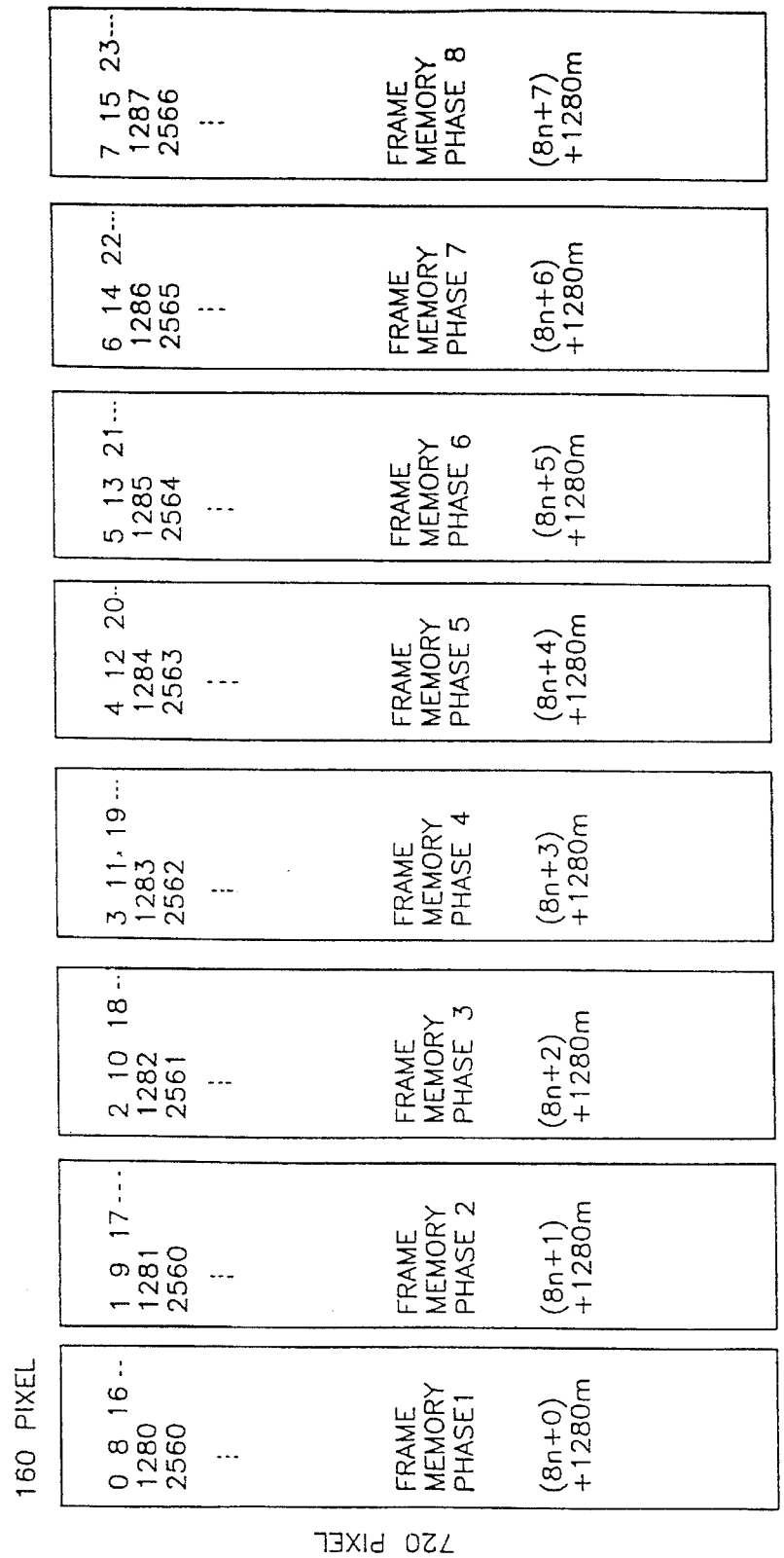
FIG. 5 is a view illustrating a configuration of a frame memory with divided eight phases in accordance with the present invention.

FIG. 5 is a view illustrating a configuration of the frame memory with the divided eight phases in accordance with the present invention. As shown in this drawing, the frame memory is divided into eight equal parts in the X-direction. A pixel value of 8n+0 is allocated to the first frame memory phase, a pixel value of 8n+1 is allocated to the second frame memory phase, a pixel value of 8n+2 is allocated to the third frame memory phase, a pixel value of 8n+3 is allocated to the fourth frame memory phase, a pixel value of 8n+4 is allocated to the fifth frame memory phase, a pixel value of 8n+5 is allocated to the sixth frame memory phase, a pixel value of 8n+6 is allocated to the seventh frame memory phase, and a pixel value of 8n+7 is allocated to the eighth frame memory phase, where n is 0, 1, 2, 3, . . . , 159 because one frame of the video data has 1280 pixels in the X-direction. As a result, 16×16 blocks are divided into the eight phases in the X-direction and no variation is present in the Y-direction.

Namely, on the basis of the macro slice address MSA and the macro block address MBA designating the location of the macro block being now processed, and the motion vector components MVX and MVY representing a motion level in the unit of the macro block, the read addresses of the frame memory can be expressed as follows:

READ ADDRESS OF FRAME MEMORY PHASE 1=(8n+0)+ 1280m

READ ADDRESS OF FRAME MEMORY PHASE 2=(8n+1)+ 1280m

READ ADDRESS OF FRAME MEMORY PHASE 3=(8n+2)+ 1280m

READ ADDRESS OF FRAME MEMORY PHASE 4=(8n+3)+ 1280m

READ ADDRESS OF FRAME MEMORY PHASE 5=(8n+4)+ 1280m

READ ADDRESS OF FRAME MEMORY PHASE 6=(8n+5)+ 1280m

READ ADDRESS OF FRAME MEMORY PHASE 7=(8n+6)+ 1280m

READ ADDRESS OF FRAME MEMORY PHASE 8=(8n+7)+ 1280m where, n=(MBA×2)+(the remainder of MVX/8)

m=(MSA×16)+MVY

Because the motion vector is detected in the unit of the macro block (16×16 pixels), the Y-read address components are determined according to (MSA×16)+MVY, whereas the X-read address components are determined according to (MBA×2) +(the remainder of MVX/8). In this case, the addition of 2 to the macro block address MBA for the X-read address components is performed by shifting the bits MBA0–MBA6 of the macro block address MBA by one bit and applying the resultant bits to inputs A1–A7 of the adders 221–228. Also for the X-read address components, the lower three bits MVX2–MVX0 of the X-motion vector component MVX corresponding to the remainder of MVX/8 are used to compensate for the frame memory phases in the following manner:

THE REMAINDER OF 1, 2, 3, 4, 5, 6 and 7 FOR FRAME MEMORY PHASE 1=001, 010, 011, 100, 101, 110 and 111

THE REMAINDER OF 2, 3, 4, 5, 6 and 7 FOR FRAME MEMORY PHASE 2=010, 011, 100, 101, 110 and 111

THE REMAINDER OF 3, 4, 5, 6 and 7 FOR FRAME MEMORY PHASE 3=011, 100, 101, 110 and 111

THE REMAINDER OF 4, 5, 6 and 7 FOR FRAME MEMORY PHASE 4 =100, 101, 110 and 111

THE REMAINDER OF 5, 6 and 7 FOR FRAME MEMORY PHASE 5=101, 110 and 111

THE REMAINDER OF 6 and 7 FOR FRAME MEMORY PHASE 6=110 and 111

THE REMAINDER OF 7 FOR FRAME MEMORY PHASE 7=111

Namely, the compensation is performed by adding 1 to the X-read address component of each phase of the frame memory.

Figure 3:
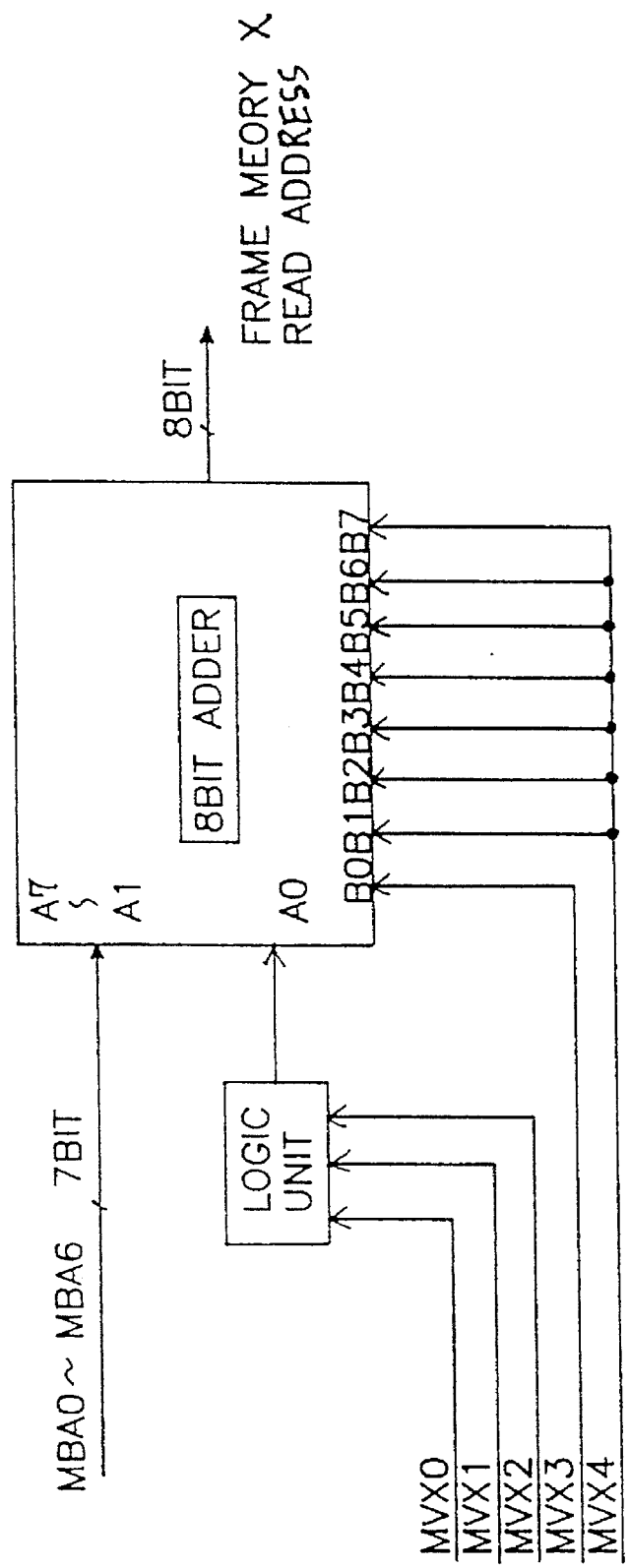
FIG. 3 is a detailed block diagram of an X-read address generation circuit in FIG. 2.

FIG. 3 is a detailed block diagram of the X-read address generation circuit 200 in FIG. 2. As shown in this drawing, the adder is of 8 bits, the macro block address MBA is of 7 bits MBA0–MBA6 and the output signal from the logic unit is of 1 bit. The 7 bits MBA0–MBA6 of the macro block address MBA and the output signal of 1 bit from the logic unit are applied to the inputs A7–A0 of the adder. Then, the adder adds the inputs A7–A0 to the upper two bits MVX4 and MVX3 of the X-motion vector component MVX. Generated as a result of the addition is the X-read address component the motion of which is compensated for.

Figure 4:
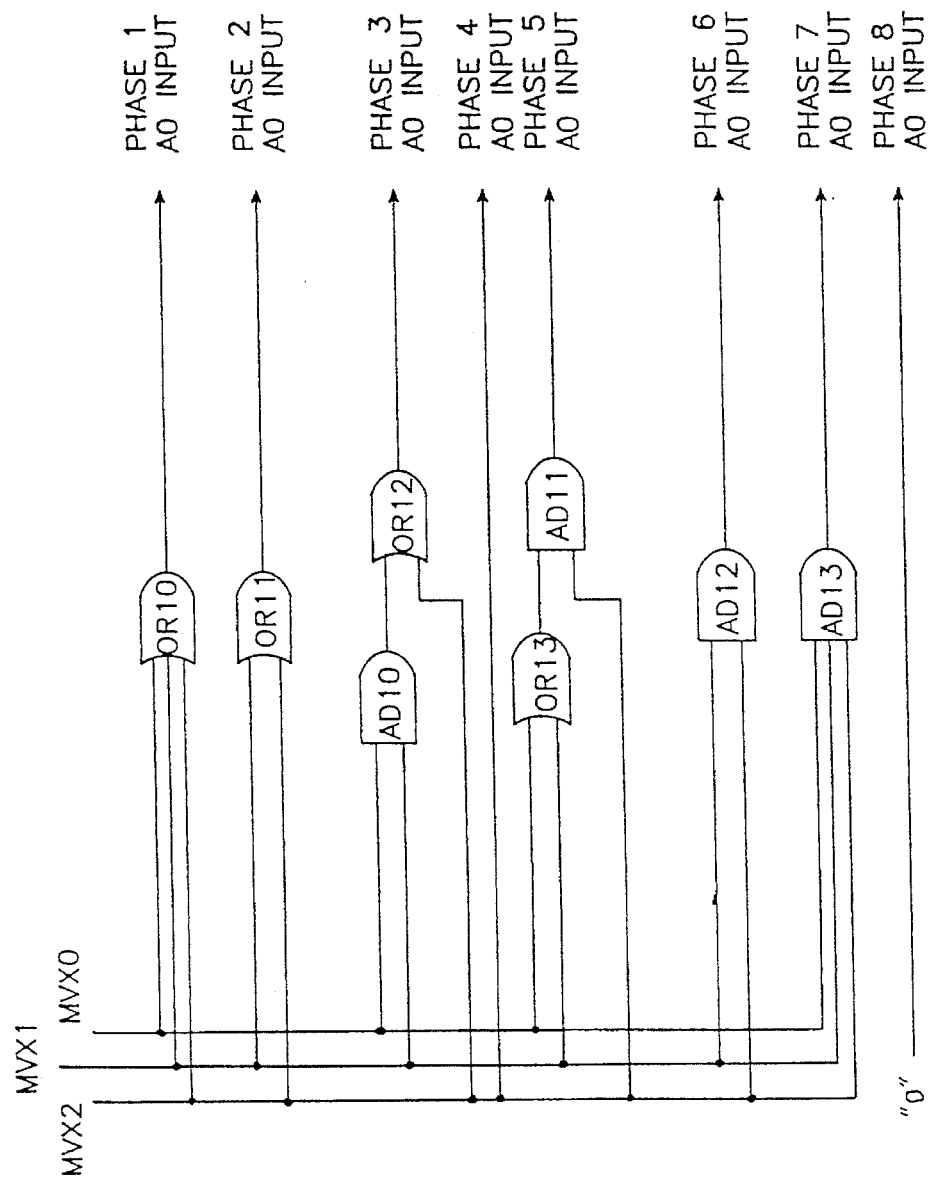
FIG. 4 is a detailed circuit diagram of a logic unit in FIG. 3.

FIG. 4 is a detailed circuit diagram of each of the logic units 211–218 in FIG. 3. As shown in this drawing, the logic unit includes OR gates OR10–OR13 and AND gates AD10–AD13 for logically combining the lower three bits MVX2–MVX0 of the X-motion vector component MVX and applying the resultant signal to the input A0 of the adder.

Namely, the OR gate OR10 ORes the lower three bits MVX2–MVX0 of the X-motion vector component MVX and applies the resultant signal to the input A0 of the adder for the first frame memory phase. The OR gate OR11 ORes the lower second and third bits MVX1 and MVX2 of the X-motion vector component MVX and applies the resultant signal to the input A0 of the adder for the second frame memory phase. The AND gate AD10 ANDs the lower first and second bits MVX0 and MVX1 of the X-motion vector component MVX. The OR gate OR12 ORes an output signal from the AND gate AD10 and the lower third bit MVX2 of the X-motion vector component MVX and applies the resultant signal to the input A0 of the adder for the third frame memory phase. The OR gate OR13 ORes the lower first and second bits MVX0 and MVX1 of the X-motion vector component MVX. The AND gate AD11 ANDs an output signal from the OR gate OR13 and the lower third bit MVX2 of the X-motion vector component MVX and applies the resultant signal to the input A0 of the adder for the fifth frame memory phase. The AND gate AD12 ANDs the lower second and third bits MVX1 and MVX2 of the X-motion vector component MVX and applies the resultant signal to the input A0 of the adder for the sixth frame memory phase. The AND gate AD13 ANDs the lower three bits MVX2–MVX0 of the X-motion vector component MVX and applies the resultant signal to the input A0 of the adder for the seventh frame memory phase. The lower third bit MVX2 of the X-motion vector component MVX is directly applied to the input A0 of the adder for the fourth frame memory phase. A logical "0" value is directly applied to the input A0 of the adder for the eighth frame memory phase.

On the other hand, in the write address generation circuit 300, the macro slice address MSA and the macro block address MBA are latched by the latches 316–317 and then applied to the counters 318 and 319, respectively. The counters 318 and 319 count the output signals from the latches 316 and 317 and output the counted results as the X and Y-write address components, respectively. The X and Y-write address components from the counters 318–319 are delayed through the FIFO memory 368 and then applied to the multiplexing circuit 400 for synchronization with the X and Y-read address components from the X and Y-read address generation circuits 200 and 100.

In the multiplexing circuit 400, the multiplexers 410 and 420 select one of the Y-read address component from the Y-read address generation circuit 100 and the Y-write address component from the write address generation circuit 300 and output the selected address to the frame memories 500 and 510, respectively. The X-read address components from the counters 241–248 in the X-read address generation circuit 200 are applied to the multiplexers 411–418, respectively. The X-read address components from the counters 241–248 in the X-read address generation circuit 200 are also applied to the multiplexers 421–428, respectively. The X-write address component from the write address generation circuit 300 is commonly applied to the multiplexers 411–418 and 421–428. Each of the multiplexers 411–418 selects one of the corresponding X-read address component from the X-read address generation circuit 200 and the X-write address component from the write address generation circuit 300 and outputs the selected address to the frame memory 500. Each of the multiplexers 421–428 selects one of the corresponding X-read address component from the X-read address generation circuit 200 and the X-write address component from the write address generation circuit 300 and outputs the selected address to the frame memory 510.

In the data processing circuit 600, the data read controller 610 reads the video data from the location of one of the frame memories 500 and 510 corresponding to the read address from the multiplexing circuit 400. The data read controller 610 then arranges the read video data in the order before the 8-phase division and applies the arranged video data to the adder 620, which then adds the applied video data to the IDCT video data and outputs the resultant video data to the data write controller 630. The data write controller 630 divides the resultant video data from the adder 620 again into the eight phases and writes the divided video data into the location of the other frame memory 500 or 510 corresponding to the write address from the multiplexing circuit 400.

The present invention is particularly concerned with the compensation for a luminance signal of the video frame, since an information amount of a chrominance signal is ¼ that of the luminance signal and the compensation for the chrominance signal can thus be performed in a general manner with no necessity for dividing the frame memory into the eight phases.

As apparent from the above description, according to the present invention, the read and write operations of the frame memories are processed in parallel at the divided eight phases. Therefore, the data processing speed can be increased and there is no necessity for storing separately the motion vector information with the inconvenience as in other memory division manners. Also, in the case where the video data is to be processed in the unit of 32×16 pixels or 64×16 pixels, the read and write operations of the frame memories may be processed in parallel at divided sixteen phases or thirty-two phases. Therefore, the data processing speed can be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video motion compensation apparatus comprising:

X-read address generation means for generating X-read address components in response to a macro block address and an X-motion vector component;

Y-read address generation means for generating a Y-read address component in response to a macro slice address and a Y-motion vector component;

write address generation means for generating X and Y-write address components in response to the macro slice address and the macro block address;

multiplexing means for multiplexing the Y-read address component from said Y-read address generation means, the X-read address components from said X-read address generation means and the X and Y-write address components from said write address generation means to generate read and write addresses of first and second frame memories; and data processing means for reading video data from a location of one of said first and second frame memories corresponding to the read address from said multiplexing means, adding the read video data to inverse discrete cosine transform video data and writing the resultant video data into a location of the other of said first and second frame memories corresponding to the write address from said multiplexing means;

each of said first and second frame memories outputting the video data stored in its location corresponding to the read address from said multiplexing means to said data processing means and storing the video data from said data processing means in its location corresponding to the write address from said multiplexing means.

2. A video motion compensation apparatus as set forth in claim 1, wherein each of said first and second frame memories has divided eight phases.

3. A video motion compensation apparatus as set forth in claim 1, wherein said X-read address generation means includes a plurality of logic units for compensating for divided eight phases of each of said first and second frame memories in response to lower first to third bits of the X-motion vector component, respectively.

4. A video motion compensation apparatus as set forth in claim 3, wherein the read address from said multiplexing means is expressed by the following equation:

$$(8n+i)+1280m$$

where, i=0, 1, . . . , 7, m=(macro slice address ×16) +Y-motion vector component and n=(macro block address ×2) +(the remainder of X-motion vector component/8).

5. A video motion compensation apparatus as set forth in claim 3, wherein said logic unit includes:

a first OR gate for ORing the lower first to third bits of the X-motion vector component and outputting the resultant signal as a signal for the compensation for the first frame memory phase;

a second OR gate for ORing the lower second and third bits of the X-motion vector component and outputting the resultant signal as a signal for the compensation for the second frame memory phase;

a first AND gate for ANDing the lower first and second bits of the X-motion vector component;

a third OR gate for ORing an output signal from said first AND gate and the lower third bit of the X-motion vector component and outputting the resultant signal as a signal for the compensation for the third frame memory phase;

a fourth OR gate for ORing the lower first and second bits of the X-motion vector component;

a second AND gate for ANDing an output signal from said fourth OR gate and the lower third bit of the X-motion vector component and outputting the resultant signal as a signal for the compensation for the fifth frame memory phase;

a third AND gate for ANDing the lower second and third bits of the X-motion vector component and outputting the resultant signal as a signal for the compensation for the sixth frame memory phase; and a fourth AND gate for ANDing the lower first to third bits of the X-motion vector component and outputting the resultant signal as a signal for the compensation for the seventh frame memory phase;

said lower third bit of the X-motion vector component being also applied directly as a signal for the compensation for the fourth frame memory phase, a logical "0" value being directly applied as a signal for the compensation for the eighth frame memory phase.

* * * * *